US011787589B2

(12) United States Patent
Hosokoshiyama

(10) Patent No.: US 11,787,589 B2
(45) Date of Patent: Oct. 17, 2023

(54) DELAMINATION CONTAINER

(71) Applicant: YOSHINO KOGYOSHO CO., LTD., Tokyo (JP)

(72) Inventor: Hiroshi Hosokoshiyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/963,916

(22) PCT Filed: Nov. 14, 2018

(86) PCT No.: PCT/JP2018/042185
§ 371 (c)(1),
(2) Date: Jul. 22, 2020

(87) PCT Pub. No.: WO2019/146224
PCT Pub. Date: Aug. 1, 2019

(65) Prior Publication Data
US 2021/0039822 A1    Feb. 11, 2021

(30) Foreign Application Priority Data

Jan. 26, 2018    (JP) .................................. 2018-012069

(51) Int. Cl.
*B65D 1/02*    (2006.01)
*B65D 1/32*    (2006.01)
*B29C 49/06*    (2006.01)

(52) U.S. Cl.
CPC ............ *B65D 1/0207* (2013.01); *B29C 49/06* (2013.01); *B65D 1/0223* (2013.01); *B65D 1/32* (2013.01)

(58) Field of Classification Search
CPC ...... B65D 1/02; B65D 1/0207; B65D 1/0215; B65D 1/0223; B65D 1/04; B65D 1/42;
(Continued)

(56) References Cited

U.S. PATENT DOCUMENTS 4,755,404 A * 7/1988 Collette ............. B29C 49/0073
215/373
5,301,838 A * 4/1994 Schmidt ............... B67D 1/0462
222/105
(Continued)

FOREIGN PATENT DOCUMENTS

JP    S62-203857 U    12/1987
JP    H08-198233 A    8/1996
(Continued)

OTHER PUBLICATIONS

Jul. 28, 2020 International Preliminary Report on Patentability issued in International Patent Application No. PCT/JP2018/042185.
(Continued)

*Primary Examiner* — Yan Lan
(74) *Attorney, Agent, or Firm* — Oliff PLC

(57) ABSTRACT

A synthetic resin-made laminated peelable container, formed by blow molding a preform assembly in which an inner preform is assembled into an outer preform, includes: an outer layer body including a tubular-shaped outer mouth and a closed-bottom tubular-shaped trunk contiguous from the outer mouth; an inner layer body including a tubular-shaped inner mouth arranged on inner side of the outer mouth and a containing chamber laminated on inner surface of the trunk in peelable manner for volume reduction and deformation; and an ambient air inlet configured to introduce ambient air between the outer and inner layer bodies. The containing chamber is integrally provided with at least two thick ribs extending along axis line of the trunk to increase thickness of the containing chamber compared with remaining portions.

8 Claims, 11 Drawing Sheets

(58) Field of Classification Search
CPC ........ B65D 1/46; B65D 1/32; B65D 83/0055; B65D 83/0061; B65D 83/0066; B65D 83/0072; B65D 2501/0027; B32B 1/02; B29C 2049/023; B29C 49/06
See application file for complete search history.

(56) References Cited

U.S. PATENT DOCUMENTS

| | | | |
|---|---|---|---|
| 6,649,121 | B1 | 11/2003 | Hamamoto et al. |
| 2012/0024742 | A1* | 2/2012 | Berger .................. B65D 23/02 206/524.1 |
| 2013/0161341 | A1 | 6/2013 | Kneer |
| 2016/0236820 | A1* | 8/2016 | Paauwe .................. B29B 11/04 |

FOREIGN PATENT DOCUMENTS

| | | |
|---|---|---|
| JP | H09-77136 A | 3/1997 |
| JP | 2001-105478 A | 4/2001 |
| JP | 3385770 B2 | 3/2003 |
| JP | 2003-165523 A | 6/2003 |
| JP | 2003-192031 A | 7/2003 |
| JP | 2006-232380 A | 9/2006 |
| JP | 2008-189315 A | 8/2008 |
| JP | 2008-213854 A | 9/2008 |
| JP | 2010-082916 A | 4/2010 |
| JP | 5168572 B2 | 3/2013 |
| JP | 2013-529580 A | 7/2013 |
| JP | 2014-046956 A | 3/2014 |
| JP | 2017-013813 A | 1/2017 |
| JP | 2017-196822 A | 11/2017 |

OTHER PUBLICATIONS

May 24, 2021 Office Action issued in Chinese Patent Application No. 201880087357.4.
Jun. 29, 2021 Office Action issued in Japanese Patent Application No. 2018-012069.
Jan. 29, 2019 International Search Report issued in International Patent Application No. PCT/JP2018/042185.
Sep. 23, 2021 Office Action issued in Canadian Patent Application No. 3,089,544.
Oct. 12, 2021 Extended Search Report issued in European Patent Application No. 18901960.7.
Dec. 23, 2021 Office Action issued in Chinese Patent Application No. 201880087357.4.
Dec. 21, 2021 Office Action issued in Japanese Patent Application No. 2018-012069.
May 13, 2022 Office Action issued in Chinese Application No. 201880087357.4.
Jun. 21, 2022 Office Action issued in Japanese Patent Application No. 2018-012069.
Dec. 6, 2022 Office Action issued in Japanese Patent Application No. 2018-012069.
May 12, 2023 Office Action issued in European Patent Application No. 18 901 960.7.

* cited by examiner

DELAMINATION CONTAINER

TECHNICAL FIELD

This disclosure relates to a synthetic resin-made laminated peelable container formed by blow molding a preform assembly including an outer preform and an inner preform assembled into the outer preform.

BACKGROUND

Synthetic resin-made laminated peelable containers (i.e., delamination containers) have been known as containers used to store, as a content liquid, food seasoning such as soy source, a beverage, a cosmetic, shampoo, rinse, liquid soap, etc. Such a laminated peelable container is formed in a dual structure including an outer layer body and an inner layer body, by blow molding a preform assembly in which an inner preform is assembled into an outer preform. The outer layer body has a tubular-shaped outer mouth and a closed-bottom tubular-shaped trunk extending contiguously from the outer mouth. The inner layer body has a tubular-shaped inner mouth arranged on an inner side of the outer mouth and also has a containing chamber laminated on an inner surface of the trunk in a peelable manner and configured to undergo volume reduction and deformation. (Refer, for example, to Patent Literature 1.)

Such a laminated peelable container is employed, for example, as a squeeze dispensing container combined with a dispensing cap with a check valve, or a pump container combined with a pump. To dispense the content liquid to the outside of the container, the trunk of the outer layer body is squeezed (pressed), or the pump is operated. On the other hand, after the content liquid is dispensed, ambient air is introduced between the outer layer body and the inner layer body through an ambient air inlet provided in the outer layer body. This permits only the containing chamber of the inner layer body to undergo volume reduction and deformation, while restoring or maintaining the outer layer body to or in the original shape. Accordingly, such a laminated peelable container may dispense the content liquid contained in the containing chamber of the inner layer body to the outside without having to replace the content liquid with ambient air. The content liquid contained inside the inner layer body is therefore protected against contact with ambient air and prevented from undergoing deterioration and a change in quality.

CITATION LIST

Patent Literature

PTL 1: JP2017-196822 A

SUMMARY

Technical Problems

However, since the conventional laminated peelable container as described above is formed by blow molding the preform assembly in which the inner preform is assembled into the outer preform, the entire containing chamber of the inner layer body is configured to be peelable from the inner surface of the trunk. The containing chamber is therefore sometimes peeled unevenly from the trunk of the outer layer body to undergo volume reduction and deformation when the content liquid is dispensed. As a result, portions of an inner surface of the containing chamber that are located at the middle thereof in a vertical direction come into close contact with each other. A dispensing path for the content liquid is narrowed or even blocked, and the conventional laminated peelable container is unlikely to be able to dispense the whole content liquid to the end.

One solution to address the above problem may be to provide an adhesive strip extending between the outer layer body and the inner layer body along an axial direction of the trunk as can be seen in a laminated peelable container formed by extrusion blow molding. The adhesive strip partially adheres the inner layer body to the outer layer body, so that volume reduction and deformation of the containing chamber may be regulated. Yet, to provide an adhesive layer between the outer layer body and the inner layer body in the laminated peelable container formed by blow molding the preform assembly in which the inner preform is assembled into the outer preform, it is necessary to incorporate a strip-shaped member that is to constitute the adhesive layer, between the outer preform and the inner preform. This raises additional problems of an increase in the number of components and assembly manhours and an increase in a manufacturing cost of the laminated peelable container.

The present disclosure has been conceived in light of the above problems. It would thus be helpful to provide, at a low cost, a laminated peelable container capable of reducing the residual amount of the content liquid, by regulating volume reduction and deformation of the containing chamber.

Solution to Problems

An aspect of the present disclosure resides in a synthetic resin-made laminated peelable container formed by blow molding a preform assembly including an outer preform and an inner preform assembled into the outer preform. The laminated peelable container includes: an outer layer body including i) a tubular-shaped outer mouth and ii) a closed-bottom tubular-shaped trunk extending contiguously from the outer mouth; an inner layer body including i) a tubular-shaped inner mouth arranged on an inner side of the outer mouth and ii) a containing chamber laminated on an inner surface of the trunk in a peelable manner and configured to undergo volume reduction and deformation; and an ambient air inlet configured to introduce ambient air between the outer layer body and the inner layer body. The containing chamber is integrally provided with at least two thick ribs each extending along an axis line of the trunk and configured to increase a thickness of the containing chamber compared with remaining portions of the containing chamber.

In a preferred embodiment of the above-described laminated peelable container according to the present disclosure, the trunk includes a shoulder extending contiguously from a lower end of the outer mouth, a tubular-shaped trunk main body extending contiguously from a lower end of the shoulder, and a bottom closing a lower end of the trunk main body, and each of the at least two thick ribs extends at least from a position corresponding to the lower end of the trunk main body to a position corresponding to an upper end of the trunk main body.

In another preferred embodiment of the above-described laminated peelable container according to the present disclosure, each of the at least two thick ribs extends from a position corresponding to the bottom to a position corresponding to the shoulder.

In yet another preferred embodiment of the above-described laminated peelable container according to the present disclosure, the at least two thick ribs are provided symmetrically about an axial center of the trunk.

In yet another preferred embodiment of the above-described laminated peelable container according to the present disclosure, the outer mouth is provided with a pair of the ambient air inlets arranged symmetrically about an axial center of the outer mouth, and each of the pair of ambient air inlets is open toward a central position in a circumferential direction about the axial center of the trunk between two adjacent thick ribs of the at least two thick ribs.

In yet another preferred embodiment of the above-described laminated peelable container according to the present disclosure, the at least two thick ribs comprise four thick ribs arranged at an equal interval in a circumferential direction about an axial center of the trunk.

In yet another preferred embodiment of the above-described laminated peelable container according to the present disclosure, each of the outer layer body and the inner layer body is made from a polyethylene terephthalate resin.

In yet another preferred embodiment of the above-described laminated peelable container according to the present disclosure, the trunk is fitted with a decorative label covering an outer surface of the trunk, the decorative label provided with a remaining-amount confirmation window that extends in a vertical direction in a position misaligned with respect to any of the at least two thick ribs in a circumferential direction to make visible a content liquid contained in the containing chamber.

Advantageous Effect

The present disclosure provides, at a low cost, a laminated peelable container that is capable of reducing the residual amount of the content liquid, by regulating volume reduction and deformation of the containing chamber.

DETAILED DESCRIPTION

With reference to the drawings, the present disclosure is illustrated in more details below.

Figure 1:
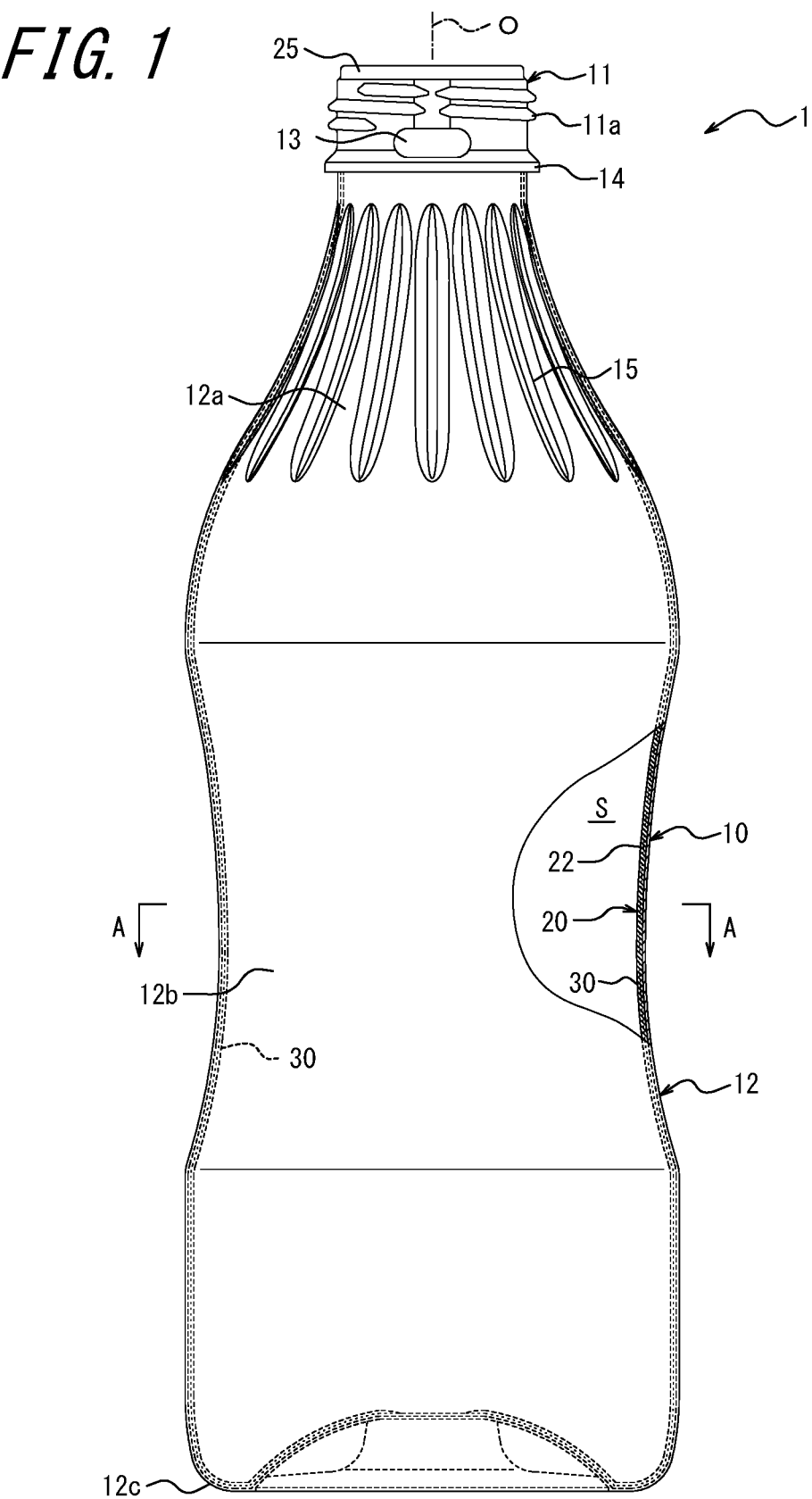
FIG. 1 is a partially cut-out side view of a laminated peelable container according to an embodiment of the present disclosure.

FIG. 1 illustrates a laminated peelable container 1, which is also called a delamination container, according to an embodiment of the present disclosure. The laminated peelable container 1 is made from a synthetic resin and has a dual structure including an outer layer body 10 and an inner layer body 20. In the following, a description is given of a case in which the laminated peelable container 1 is used as a squeeze dispensing container that may contain food seasoning, such as soy source, as a content liquid.

Note that, in the present disclosure, the claims, and the drawings, a vertical direction refers to a vertical direction in a state in which the laminated peelable container 1 stands upright as illustrated in FIG. 1, and a radial direction refers to a direction passing an axial center O of the laminated peelable container 1 and extending along a line perpendicular to the axial center O.

The outer layer body 10 refers to a portion constituting an outer shell of the laminated peelable container 1. The outer layer body 10 has a bottle shape including an outer mouth 11 and a closed-bottom tubular-shaped trunk 12, which extends contiguously from a lower end of the outer mouth 11.

Figure 2:
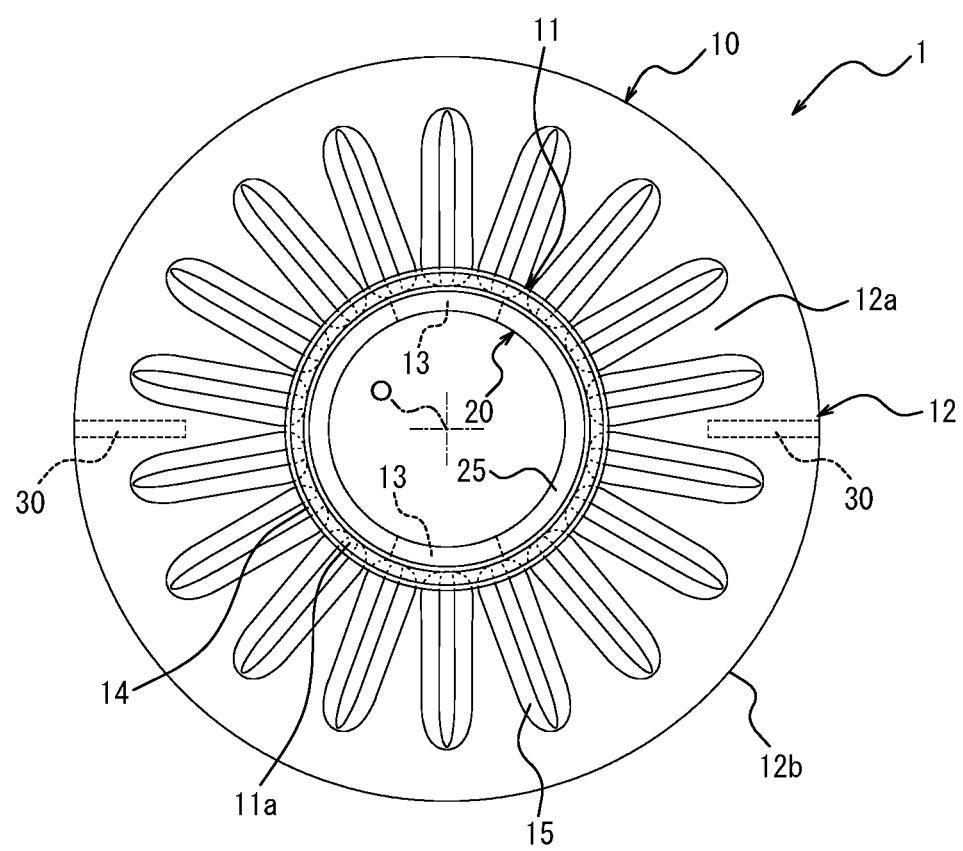
FIG. 2 is a plan view of a laminated peelable container illustrated in FIG. 1.

As illustrated in FIGS. 1 and 2, the outer mouth 11 has a cylindrical shape having an outer circumferential surface integrally provided with a male screw 11a. The outer mouth 11 may be fitted with a dispensing cap (which is not illustrated) including a dispensing spout, by screw-connecting the dispensing cap to the male screw 11a.

Additionally, the outer mouth 11 may have a ring-shaped protrusion instead of the male screw 11a, and the dispensing cap may be fitted to the protrusion by plugging i.e., undercut engagement. In this case, the outer mouth 11 does not need to have a cylindrical shape and may have any tubular shape, such as a square tubular shape and an elliptic cylinder shape.

The outer mouth 11 is provided with a pair of ambient air inlets 13. Each of the pair of ambient air inlets 13 is formed as a long through hole passing through the outer mouth 11 in the radial direction and extending in a circumferential direction. The pair of ambient air inlets 13 is arranged symmetrically about the axial center O on both sides of the outer mouth 11. The pair of ambient air inlet 13 each communicates between the outer layer body 10 and the inner layer body 20, so that ambient air may be introduced between the outer layer body 10 and the inner layer body 20 through the ambient air inlet holes 13.

The outer mouth 11 is also integrally provided, on the lower side of the ambient air inlets 13 thereof, with a neck ring 14. The neck ring 14 extends in a ring shape around the entire circumference of the outer mouth 11. The neck ring 14 also protrudes toward an outer side in the radial direction from an outer circumferential surface of the outer mouth 11.

The trunk 12 includes a shoulder 12a, a trunk main body 12b, and a bottom 12c.

The shoulder 12a is integrally connected to a lower end of the outer mouth 11. With a diameter of the shoulder 12a gradually increased toward the lower side, the shoulder 12a protrudes toward the outer side in the radial direction with respect to the outer mouth 11. The trunk main body 12b is formed in a tubular shape having a narrowed portion and also having a substantially circular section. The trunk main body 12b is integrally connected, at an upper end thereof, to a lower end of the shoulder 12a. The bottom 12c is integrally connected to a lower end of the trunk main body 12b to close the lower end of the trunk main body 12b. The bottom 12c has a ring shape with a periphery whose inner side is concaved. By placing the bottom 12c on the ground, the laminated peelable container 1 is placed in an upright position.

The trunk main body 12b has flexibility. When squeezed (pressed), the trunk main body 12b may undergo elastic deformation to be dented, and, with the elastic force, the trunk main body 12b may restore from the dented state to the original shape by itself. Since the trunk main body 12b is configured to undergo elastic deformation in response to squeezing, an operation of dispensing the content liquid is facilitated when the laminated peelable container 1 is employed as a squeeze dispensing container. Furthermore, since the trunk main body 12b is easily restored to the original shape after the dispensing of the content liquid, ambient air is reliably introduced between the outer layer body 10 and the inner layer body 20 through the ambient air inlets 13. Accordingly, the function of the laminated peelable container 1 is reliably performed.

The shoulder 12a is provided with a plurality of (e.g., 18) concave ribs 15, which extend in the vertical direction and which are arranged at an equal interval around the entire circumference of the shoulder 12a in the circumferential direction. For convenience of illustration, in FIGS. 1 and 2, reference numeral is assigned only to the single concave rib 15. Providing the plurality of concave ribs 15 in the shoulder portion 12a makes it easier to peel the inner layer body 20 from the outer layer body 10 in the shoulder portion 12a. Additionally, the concave ribs 15 may also be omitted.

The inner layer body 20 includes an inner mouth 21 and a container chamber 22.

Figure 3:
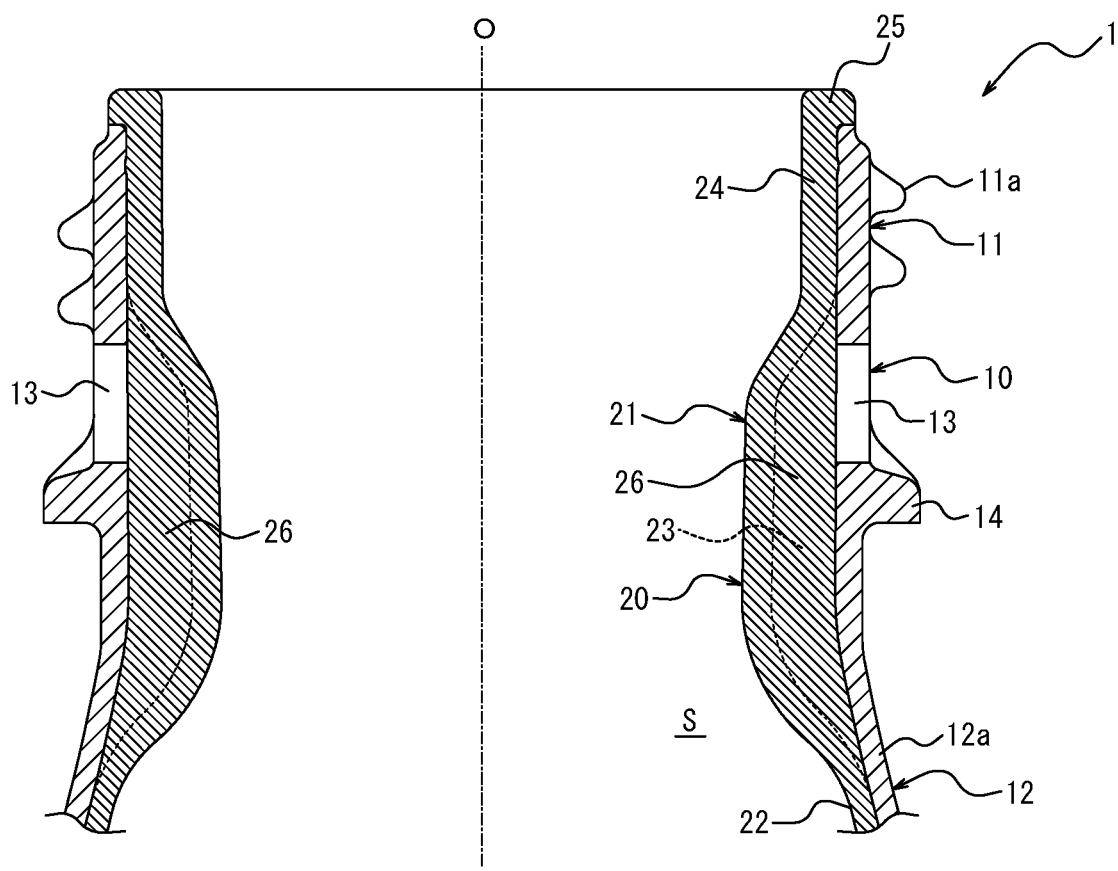
FIG. 3 is a partially cut-out sectional view illustrating a portion of a laminated peelable container that corresponds to an outer mouth.

As illustrated in FIG. 3, the inner mouth 21 has a cylindrical shape whose diameter is smaller than that of the outer mouth 11 and is arranged coaxially with the outer mouth 11 on an inner side of the outer mouth 11. Between an inner circumferential surface of the outer mouth 11 and an outer circumferential surface of the inner mouth 21, a gap 23 of a predetermined distance is provided. The inner mouth 21 is integrally and contiguously provided, in an upper end thereof, with a large-diameter portion 24. With the entire outer circumferential surface of the large-diameter portion 24 abutting against the inner circumferential surface of the outer mouth 11, the gap 23 defined between the outer mouth 11 and the inner mouth 21 is closed from the outside in an upper end portion of the outer mouth 11 or the inner mouth 21. The large-diameter portion 24 is integrally provided, at an upper end thereof, with a flange portion 25, which extends toward the outer side in the radial direction. With the flange portion 25 abutting against the upper end of the outer mouth 11, the inner mouth 21 is positioned with respect to the outer mouth 11 in an axial direction.

Additionally, the inner mouth 21 does not need to have a cylindrical shape and may have any tubular shape. For example, when the outer mouth 11 is formed in a square tubular or an elliptic cylinder shape, the inner mouth 21 may be similarly formed in a square tubular or an elliptic cylinder shape.

As illustrated in FIG. 1, the containing chamber 22 is formed in a bag shape whose thickness is smaller than that of the trunk 12. The containing chamber 22 extends contiguously from a lower end of the inner mouth 21 and is laminated on an inner surface of the trunk 12 in a peelable manner. The containing chamber 22 defines, inside thereof, containing space S for the content liquid. The content liquid may be filled into the containing chamber 22 through the inner mouth 21, and the content liquid contained in the containing chamber 22 may also be dispensed to the outside through the inner mouth 21. In conjunction with dispensing of the content liquid, the containing chamber 22 may undergo volume reduction and deformation (i.e., deformation by which an inner volume is reduced) while being peeled from the inner surface of the trunk 12. Due to the volume reduction and deformation of the containing chamber 22, ambient air is introduced between the outer layer body 10 and the inner layer body 20 through the ambient air inlets 13. Accordingly, only the containing chamber 22 is easily peeled from the inner surface of the trunk 12 and undergoes volume reduction and deformation, while the trunk main body 12b remains in or is restored to the original shape.

As illustrated in FIG. 3, to secure an airway for ambient air from the ambient air inlets 13 into and between the trunk 12 and the containing chamber 22, the inner layer body 20 is integrally provided, on an outer surface thereof, with vertical ribs 26. Although not illustrated in details, in the laminated peelable container 1 according to the present embodiment, the inner layer body 20 is provided, on the outer surface thereof, with three vertical ribs 26, which are arranged at an interval in the circumferential direction within a predetermined range in the circumferential direction centered at one of the pair of ambient air inlets 13, and further with three vertical ribs 26, which are arranged at an interval in the circumferential direction within a predetermined range in the circumferential direction centered at the other one of the pair of ambient air inlets 13. At least a different one of the vertical ribs 26 faces each ambient air inlet 13. Each vertical rib 26 protrudes toward the outer side in the radial direction from the outer surface of the inner layer body 20 and extends from the inner mouth 21 to the containing chamber 22 in a direction defined along the axial center O. Each vertical rib 26 thus forms a flow path for ambient air between the outer layer body 10 and the inner layer body 20, in a manner such that the flow path for ambient air extends from the ambient air inlets 13 through the neck ring 14 and even to a portion between the shoulder 12a and the containing chamber 22. This ensures that the flow paths for ambient air introduced from the ambient air inlets 13 lead between the shoulder 12a and the containing chamber 22.

Additionally, the vertical ribs 26 may also be provided on the inner circumferential surface of the outer mouth 11. Furthermore, the vertical ribs 26 may also be omitted in both the outer mouth 11 and the inner mouth 21.

In the present embodiment, each of the outer layer body 10 and the inner layer body 20 is made from a polyethylene terephthalate (PET) resin. Using a polyethylene terephthalate resin as a material of the outer layer body 10 and the inner layer body 20 creates the light-weight laminated peelable container 1 with high transparency.

To reduce the residual amount of the content liquid remained in the containing space S by regulating volume reduction and deformation of the containing chamber 22, the containing chamber 22 of the inner layer body 20 is integrally provided with two thick ribs 30.

Figure 4:
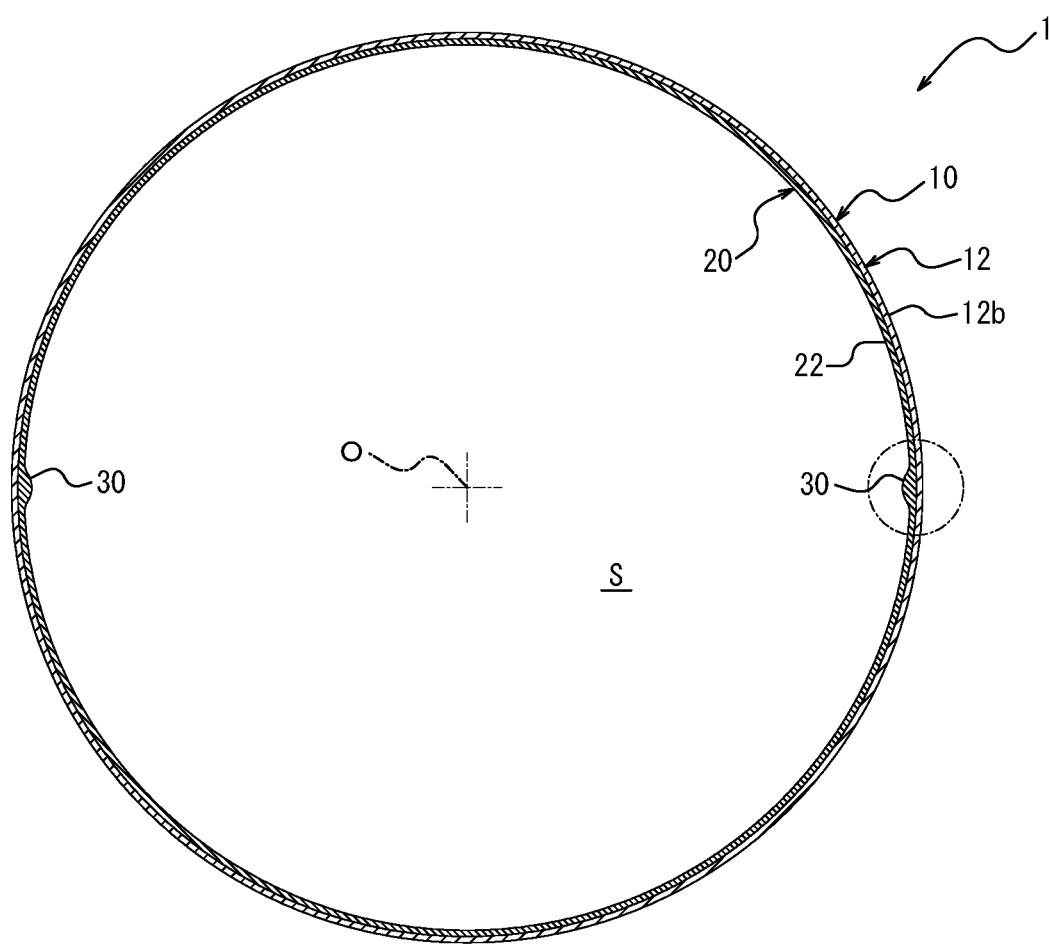
FIG. 4 is a sectional view taken along an A-A line in FIG. 1.

As illustrated in FIGS. 1 and 4, the two thick ribs 30 are arranged symmetrically about an axial center of the trunk 12

(i.e., the axial center O of the laminated peelable container 1) and extends in the vertical direction along an axis line (i.e., the axial center O) of the trunk 12. The thick ribs 30 are provided in the containing chamber 22 in a manner such that the thick ribs 30 each extend straight from a position corresponding to the center (i.e., the axial center O) of the bottom 12c through the trunk main body 12b and to a position substantially at the middle of the shoulder 12a in the vertical direction.

Additionally, as illustrated in FIG. 2, each of the pair of ambient air inlets 13, which is provided in the outer mouth 11, is arranged to open toward a central position in the circumferential direction about the axial center O of the trunk 12 between the two adjacent thick ribs 30. That is to say, a direction in which the pair of ambient air inlets 13 opens is offset by 90 degrees in the circumferential direction about the axial center O with respect to a direction in which the pair of thick ribs 30 is provided.

Figure 5:
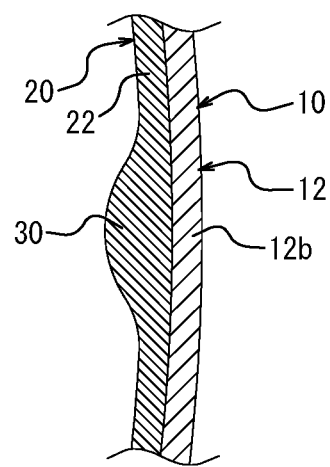
FIG. 5 is an enlarged view of a portion surrounded by a dashed line in FIG. 4.

As illustrated in FIGS. 4 and 5, the two thick ribs 30 each protrude toward the inner side in the radial direction from an inner circumferential surface of the containing chamber 22, and the thickness of portions of the containing chamber 22 in which the thick ribs 30 are provided is greater than that of the remaining portions of the containing chamber 22 in which no thick rib 30 is provided. As a result, rigidity in the portions of the containing chamber 22 in which the thick ribs 30 are provided is greater than the rigidity of the remaining portions of the containing chamber 22 in which no thick rib 30 is provided. Accordingly, the portions of the containing chamber 22 in which the thick ribs 30 are provided and which are located on both sides about the axial center O are less likely to undergo volume reduction and deformation toward the inner side in the radial direction, that is to say, less likely to be peeled from the inner surface of the trunk main body 12b, compared with the remaining portions of the containing chamber 22 in which no thick rib 30 is provided. Each thick rib 30 has a cross-sectional shape having both sides in the circumferential direction from which a protrusion height gradually increases and also having a smoothly curved top portion at the greatest protrusion height.

The laminated peelable container 1 according to the present embodiment with the above configuration may be formed into a squeeze container by fitting a dispensing cap to the outer mouth 11. In this case, the dispensing cap may be the one including a check valve for ambient air that is configured to permit ambient air to be introduced to the ambient air inlets 13 while preventing ambient air from flowing to the outside from the ambient air inlets 13 and also including a check valve for the content liquid that is configured to permit the content liquid to be dispensed to the outside through the inner mouth 21 while preventing ambient air from flowing back into the containing chamber 22.

In the laminated peelable container 1 formed as a squeeze container, the trunk main body 12b of the outer layer body 10 is to be squeezed (pressed) to let the containing chamber 22 undergo volume reduction and deformation to thereby push out and dispense the content liquid to the outside from the dispensing cap. After the content liquid is dispensed, when the trunk main body 12b is released from squeezing, the trunk main body 12b tries to restore to the original shape. At this time, since the containing chamber 22 of the inner layer body 20 is peeled from the inner surface of the trunk 12 at the same time as ambient air being introduced between the outer layer body 10 and the inner layer body 20 through the ambient air inlets 13, only the trunk main body 12b is restored to the original shape while the containing chamber 22 remains subject to volume reduction and deformation.

Accordingly, the content liquid contained in the containing chamber 22 is dispensed without having to replace the content liquid with ambient air. The content liquid contained in the containing chamber 22 is therefore protected against contact with ambient air and prevented from undergoing deterioration and a change in quality.

Figure 6:
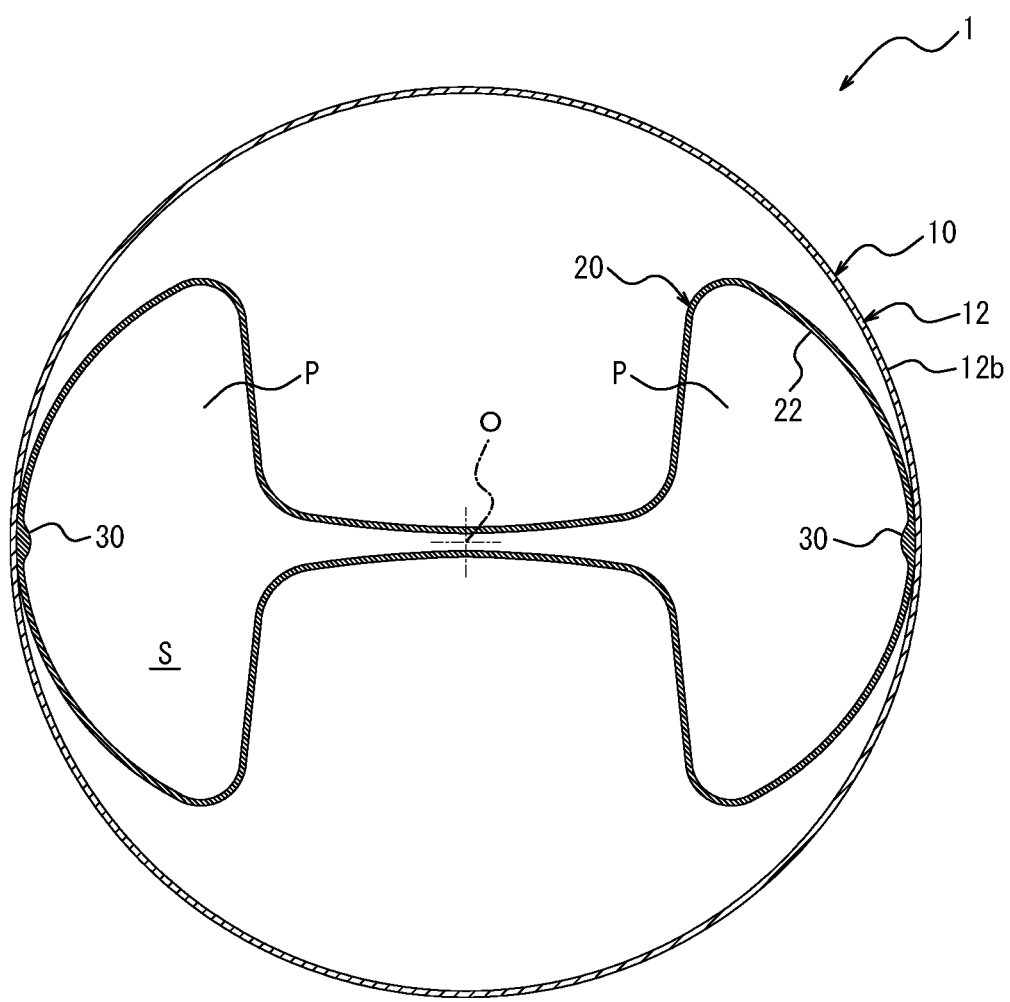
FIG. 6 is a sectional view corresponding to FIG. 4 that illustrates a state in which a containing chamber is peeled from a trunk.

Since, in the laminated peelable container 1 according to the present embodiment, the two thick ribs 30 are integrally provided in the containing chamber 22, as illustrated in FIG. 6, when the containing chamber 22 undergoes volume reduction and deformation in conjunction with dispensing of the content liquid, the containing chamber 22 does so in the following manner. That is to say, the portions of the containing chamber 22 in which the two thick ribs 30 are provided are prevented from being peeled from the inner surface of the trunk main body 12b, while both sides of the remaining portions of the containing chamber 22 in which no thick ribs 30 is provided come close to each other about the axial center O. At this time, a portion of the containing chamber 22 that corresponds to the trunk main body 12b is capable of undergoing even volume reduction and deformation into a flattened shape whose section is substantially uniform in the direction of the axial center O of the trunk 12 (i.e., in the vertical direction). Accordingly, even when the remaining amount of the content liquid is small, a circulation path P for the content liquid that extends vertically from the bottom 12c through the trunk main body 12b and toward the shoulder 12a is more likely to be maintained in adjacent to the thick ribs 30 in the containing space S defined in the containing chamber 22. This permits dispensing of the whole content liquid to the end and reduces the residual amount of the content liquid.

Thus, according to the laminated peelable container 1 in the present embodiment, the simple configuration with the two thick ribs 30, which are integrally provided in the containing chamber 22, permits regulation of volume reduction and deformation of the containing chamber 22, that is to say, permits the containing chamber 22 to undergo even volume reduction and deformation into a flattened shape whose section is substantially uniform in the direction of the axial center O of the trunk 12, without having to provide an adhesive strip that partially adheres the inner layer body 20 to the outer layer body 10. The above configuration therefore prevents the problem of inability to dispense the content liquid to the end due to narrowing and blockage of a dispensing path for the content liquid as a result of portions of the inner surface of the containing chamber 22 that are located at the middle thereof in the vertical direction coming into close contact with each other. Accordingly, the residual amount of the content liquid remained in the laminated peelable container 1 is reduced.

Furthermore, since in the laminated peelable container 1 according to the present embodiment the two thick ribs 30 are arranged symmetrically about the axial center O of the trunk 12, the both sides, about the axial center O of the trunk 12, of the portions of the containing chamber 22 in which no thick rib 30 is provided are permitted to undergo even volume reduction and deformation. The above configuration further ensures that the containing chamber 22 undergoes even volume reduction and deformation, thereby even more reliably reducing the residual amount of the content liquid remained in the laminated peelable container 1.

In the laminated peelable container 1 according to the present embodiment, each of the two thick ribs 30 preferably extends at least from a position in the containing chamber 22 that corresponds to the lower end of the trunk main body 12b to a position in the containing chamber 22 that corresponds to an upper end of the trunk main body 12b. This configuration permits most of the containing chamber 22 to undergo even volume reduction and deformation as described above, thereby even more reliably reducing the residual amount of the content liquid remained in the laminated peelable container 1. Especially, by configuring each thick rib 30 to extend from a position in the containing chamber 22 that corresponds to the bottom 12c to a position in the containing chamber 22 that corresponds to the shoulder 12a as in the present embodiment, an even greater portion of the containing chamber 22 that encompasses a portion of the containing chamber 22 that corresponds to the shoulder 12a undergoes even volume reduction and deformation as described above, while volume reduction and deformation of a portion of the containing chamber 22 that corresponds to the bottom 12c is also regulated. Accordingly, the residual amount of the content liquid remained in the laminated peelable container 1 is reduced even more reliably. Furthermore, since each of the two thick ribs 30 reaches a position in the containing chamber 22 that corresponds to the bottom 12c, the portions of the containing chamber 22 in which the thick ribs 30 are provided are unlikely to be peeled from an inner surface of the bottom 12c. This configuration permits a portion of the containing chamber 22 that corresponds to the bottom 12c to remain fixed to the bottom 12c in accordance with the flattened shape and prevents the portion of the containing chamber 22 that corresponds to the bottom 12c from undergoing uneven volume reduction and deformation. Accordingly, the entire containing chamber 22 undergoes even volume reduction and deformation into the flattened shape.

Furthermore, in the laminated peelable container 1 according to the present embodiment, as illustrated in FIG. 2, each of the pair of ambient air inlets 13, which is provided in the outer mouth 11, is open toward the central position in the circumferential direction about the axial center O of the trunk 12 between the two adjacent thick ribs 30. Accordingly, ambient air introduced from the ambient air inlets 13 is even more efficiently supplied between the portions of the containing chamber 22 in which no thick rib 30 is provided and the trunk main body 12b, and the portions of the containing chamber 22 in which no thick rib 30 is provided are peeled from the inner surface of the trunk main body 12b even more actively than the portions of the containing chamber 22 in which the thick ribs 30 are provided. This configuration therefore further ensures that the containing chamber 22 undergoes even volume reduction and deformation, thereby even more reliably reducing the residual amount of the content liquid remained in the laminated peelable container 1.

Figure 7:
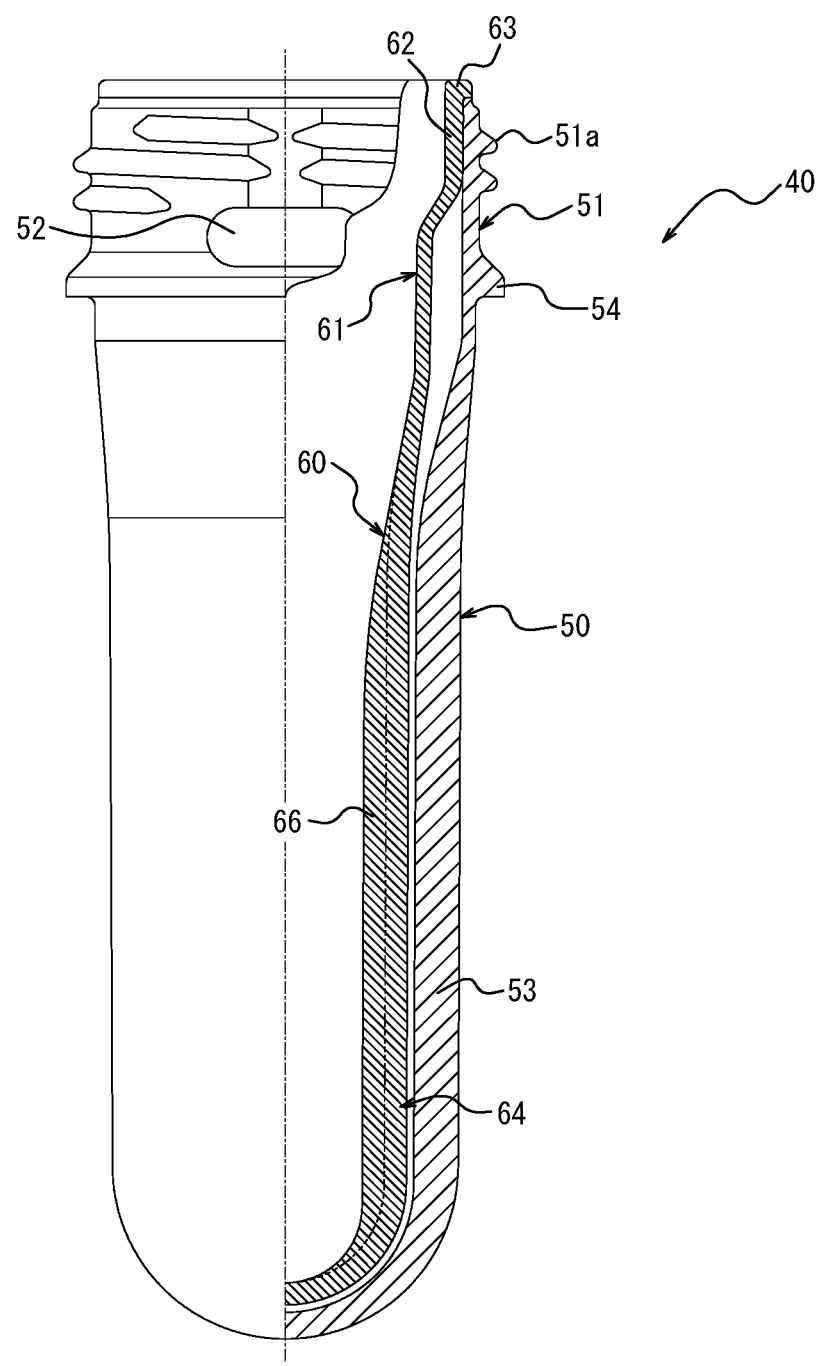
FIG. 7 is a partially cut-out side view of a preform assembly used to form a laminated peelable container illustrated in FIG. 1.

The laminated peelable container 1 with the above configuration may be formed by blow molding a preform assembly 40, which is made from a synthetic resin, as illustrated in FIG. 7. The preform assembly 40 has a dual structure including a synthetic resin-made outer preform 50, which is used to form the outer layer body 10, and a synthetic resin-made inner preform 60, which is used to form the inner layer body 20 and which is assembled into the outer preform 50.

The outer preform 50 is formed into a predetermined shape corresponding to the outer layer body 10 by injection molding a synthetic resin material same as that of the outer layer body 10 with use of a mold. In the present embodiment, the outer preform 50 is made from a polyethylene terephthalate resin, similarly to the outer layer body 10.

The outer preform 50 includes an outer mouth 51, which has the same shape as the outer mouth 11 of the outer layer body 10. That is to say, the outer mouth 51 has a cylindrical shape having an outer circumferential surface integrally provided with a male screw 51a. The outer mouth 51 is also provided, on both sides thereof about an axial center of the outer mouth 51, with a pair of ambient air inlets 52, each of which passes through the outer mouth 51 in the radial direction. The outer preform 50 also includes a stretched portion 53, which is integrally provided in a lower end of the outer mouth 51 and which has a substantially test-tube shape with a hemispherical-shaped bottom. The thickness of the stretched portion 53 is greater than that of the outer mouth 51. Between the outer mouth 51 and the stretched portion 53, there is integrally provided a flange-shaped neck ring 54.

The inner preform 60 is formed into a predetermined shape corresponding to the inner layer body 20 by injection molding a synthetic resin material same as that of the inner layer body 20 with use of a mold. In the present embodiment, the inner preform 60 is made from a polyethylene terephthalate resin, similarly to the inner layer body 20.

The inner preform 60 includes an inner mouth 61, which has the same shape as the inner mouth 21 of the inner layer body 20. That is to say, the inner mouth 61 has a cylindrical shape whose diameter is smaller than that of the outer mouth 51 and is arranged coaxially with the outer mouth 51 on an inner side of the outer mouth 51. The inner mouth 61 is integrally and contiguously provided, in an upper end thereof, with a large-diameter portion 62. With the entire outer circumferential surface of the large-diameter portion 62 abutting against the inner circumferential surface of the outer mouth 51, an upper end portion of a gap defined between the outer mouth 51 and the inner mouth 61 is closed from the outside. The large-diameter portion 62 is integrally provided, in an upper end thereof, with a flange portion 63, which extends toward the outer side in the radial direction. With the flange portion 63 abutting against the upper end of the outer mouth 51, the inner mouth 61 is positioned with respect to the outer mouth 51 in the axial direction. The inner preform 60 also includes a stretched portion 64, which is integrally provided in a lower end of the inner mouth 61 and which has a substantially test-tube shape with a hemispherical-shaped bottom. The outer diameter of the stretched portion 64 is smaller than that of the inner mouth 61. Between an outer circumferential surface of the stretched portion 64 and an inner circumferential surface of the stretched portion 53, a gap is provided to prevent a damage on the outer circumferential surface of the stretched portion 64 and the inner circumferential surface of the stretched portion 53 during assembly of the inner preform 60 into the outer preform 50.

Figure 8:
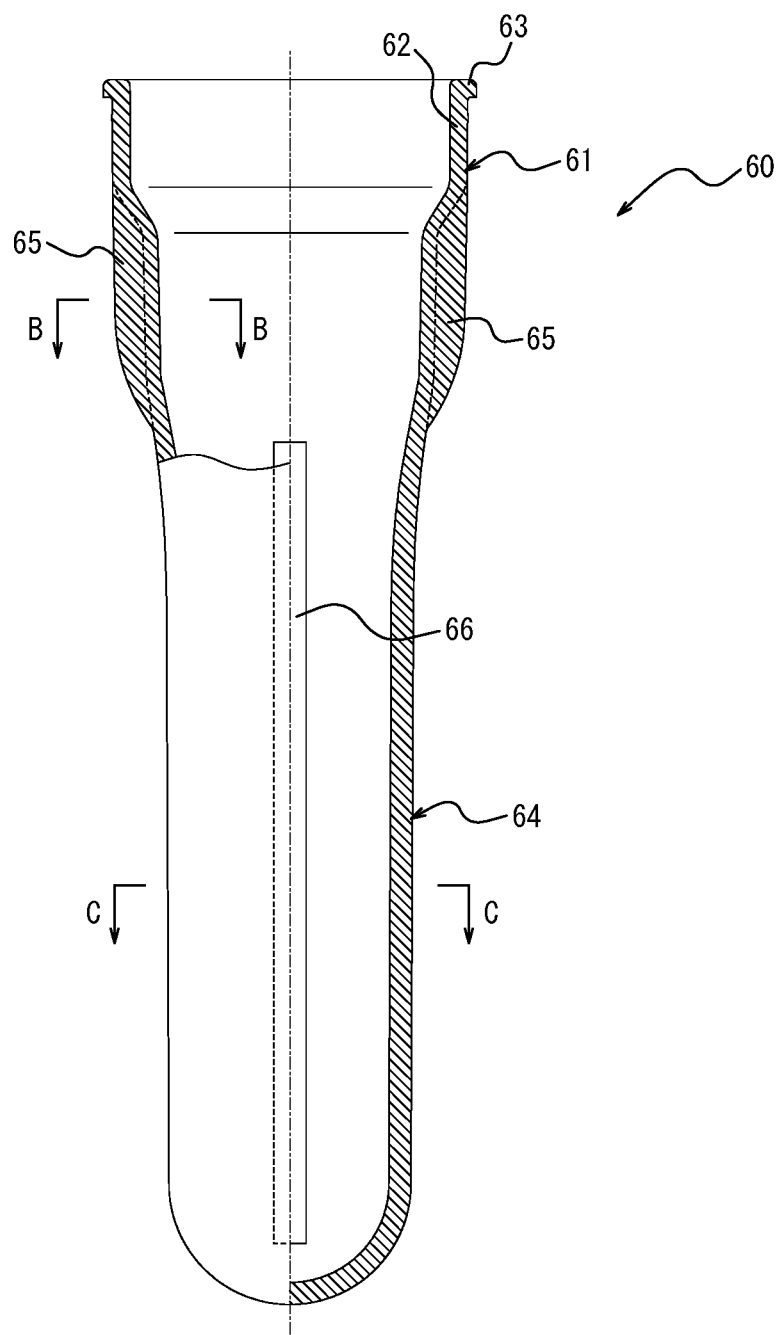
FIG. 8 is a partially cut-out side view of an inner preform illustrated in FIG. 7.
Figure 9:
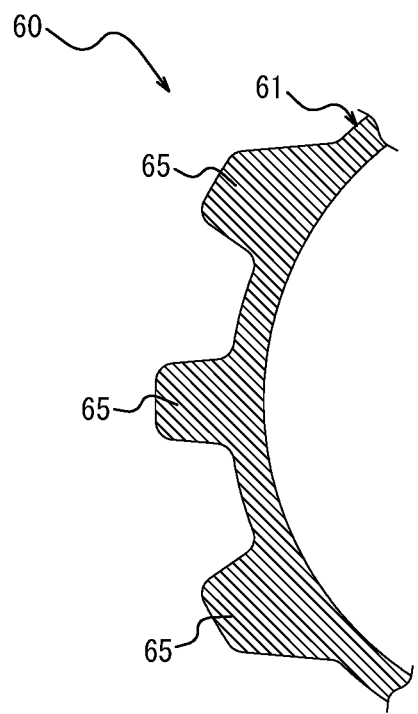
FIG. 9 is a sectional view taken along a B-B line in FIG. 8.

As illustrated in FIG. 8, the inner preform 60 is provided, on an outer surface thereof, with a plurality of vertical ribs 65, which correspond to the plurality of vertical ribs 26. Although not illustrated in details, the inner preform 60 is provided, on the outer surface thereof, with three vertical ribs 65, which are arranged at an interval in the circumferential direction within a predetermined range in the circumferential direction centered at one of the pair of ambient air inlets 52, and further with three vertical ribs 65, which are arranged at an interval in the circumferential direction within a predetermined range in the circumferential direction centered at the other one of the pair of ambient air inlets 52. The vertical ribs 65 have respective shapes as illustrated in FIG. 9.

Figure 10:
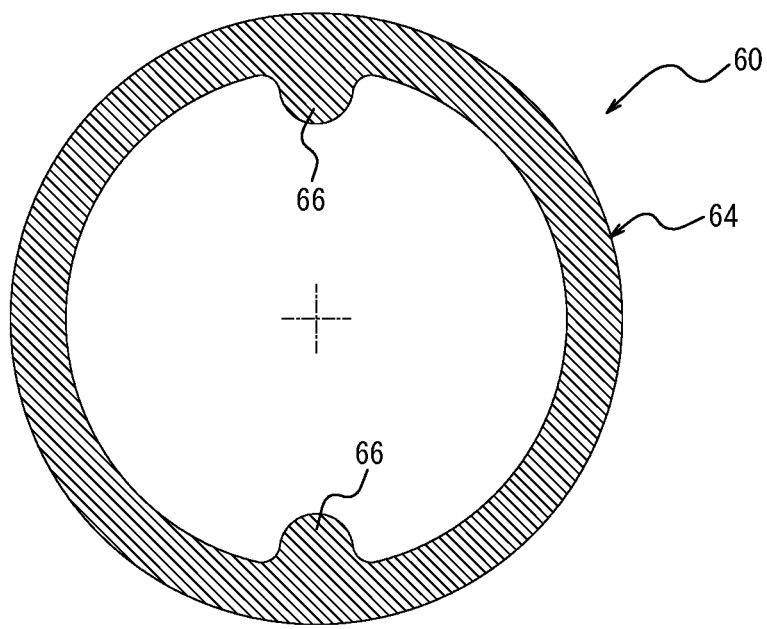
FIG. 10 is a sectional view taken along a C-C line in FIG. 8.

Furthermore, as illustrated in FIGS. 8 and 10, the stretched portion 64 of the inner preform 60 is integrally provided, on an inner surface thereof, with two thickness formation ribs 66, which protrude toward the inner side in the radial direction from an inner circumferential surface of the stretched portion 64 to increase the thickness of the stretched portion 64 compared with the remaining portions thereof. The two thickness formation ribs 66 are arranged symmetrically about an axial center of the stretched portion 64. When the preform assembly 40 is blow molded, these thickness formation ribs 66 are to be stretched together with the stretched portion 64 and molded into the thick ribs 30. The thickness formation ribs 66 each have a substantially hemispherical-shaped section and extend straight from about an upper end to about a lower end of the stretched portion 64 along the axial center of the stretched portion 64.

The laminated peelable container 1 illustrated in FIG. 1 may be manufactured by blow molding the preform assembly 40 with the above configuration. In the present embodiment, biaxial stretch blow molding is employed as a method of blow molding.

In more details, for biaxial stretch blow molding of the preform assembly 40, the preform assembly 40 is placed in a blow molding mold (which is not illustrated) constituting a blow molding apparatus, in a manner such that the outer mouth 51 and the inner mouth 61 protrude from a cavity of the mold and that the neck ring 54 is supported by an upper surface of the mold and the stretched portions 53 and 64 are positioned within the cavity. Under this condition, a pressurizing medium, such as pressurized air and a pressurized liquid, is supplied into the preform assembly 40 through the inner mouth 61 at the same time as stretching the stretched portions 53 and 64 in the axial direction with use of a stretching rod. In this way, the stretched portions 53 and 64 are blow molded into a shape conforming to an inner surface of the cavity. Thus, the laminated peelable container 1 with the above configuration may be easily manufactured by biaxially stretch blow molding the preform assembly 40, in which the injection blow-molded inner preform 60 is assembled into the injection blow-molded outer preform 50.

Figure 11:
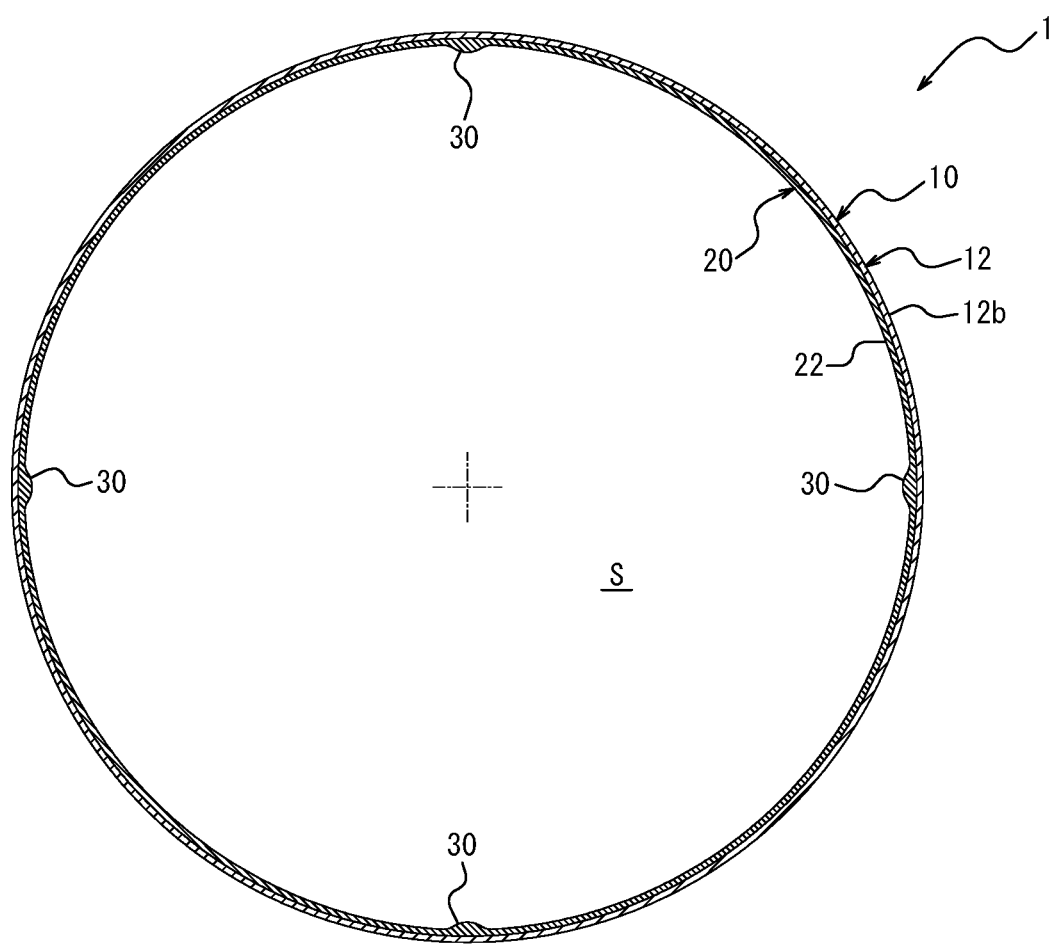
FIG. 11 is a sectional view of a laminated peelable container according to a modification in which four thick ribs are provided in a containing chamber.
Figure 12:
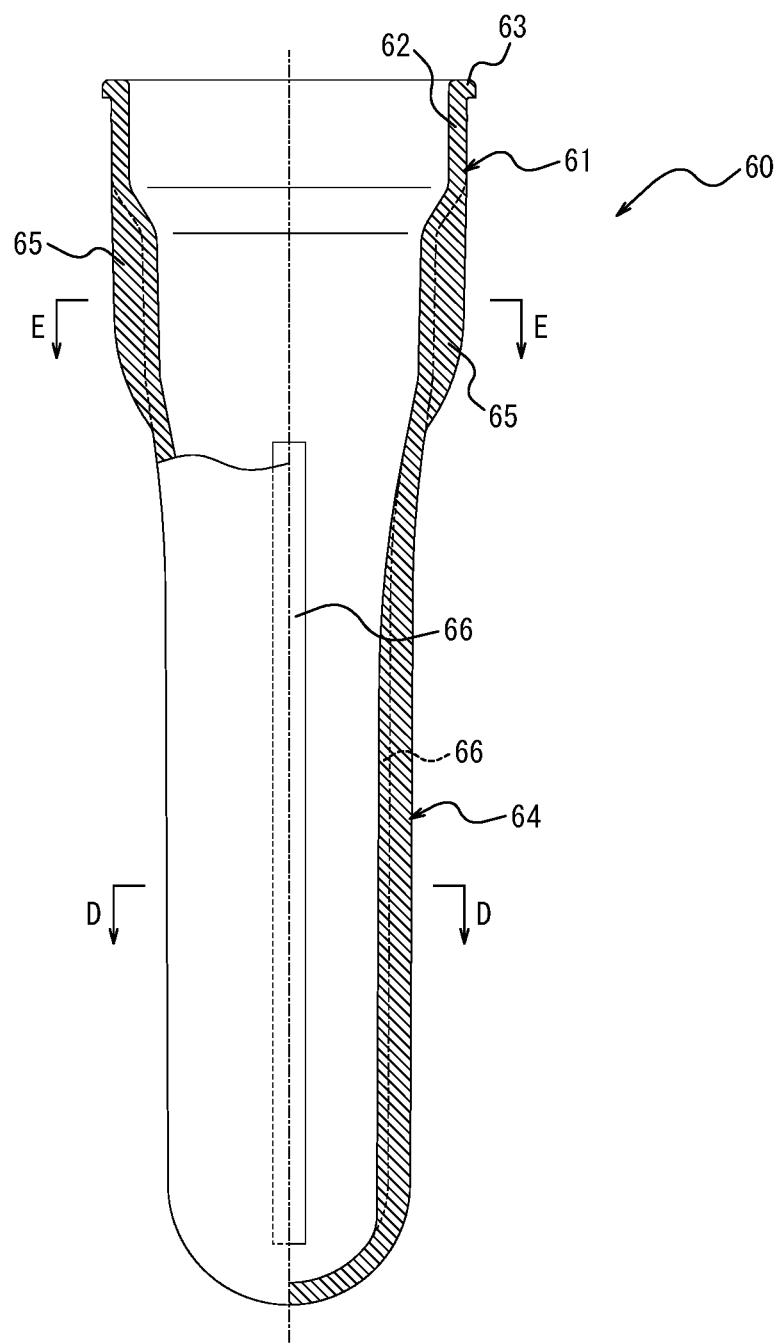
FIG. 12 is a partially cut-out side view of an inner preform used to form a laminated peelable container according to a modification as illustrated in FIG. 11.
Figure 13:
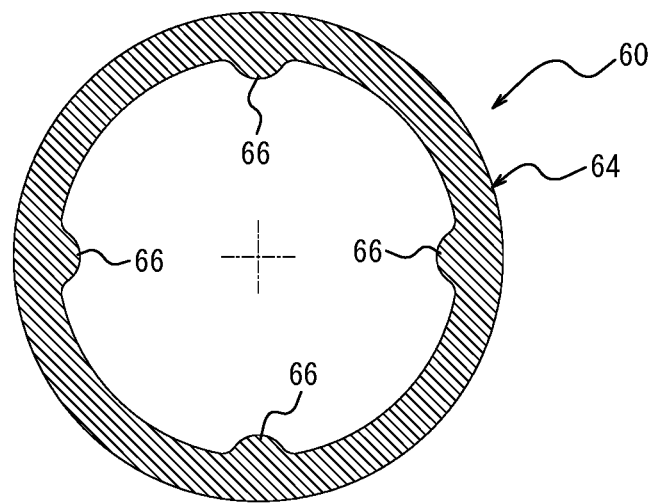
FIG. 13 is a sectional view taken along a D-D line in FIG. 12.
Figure 14:
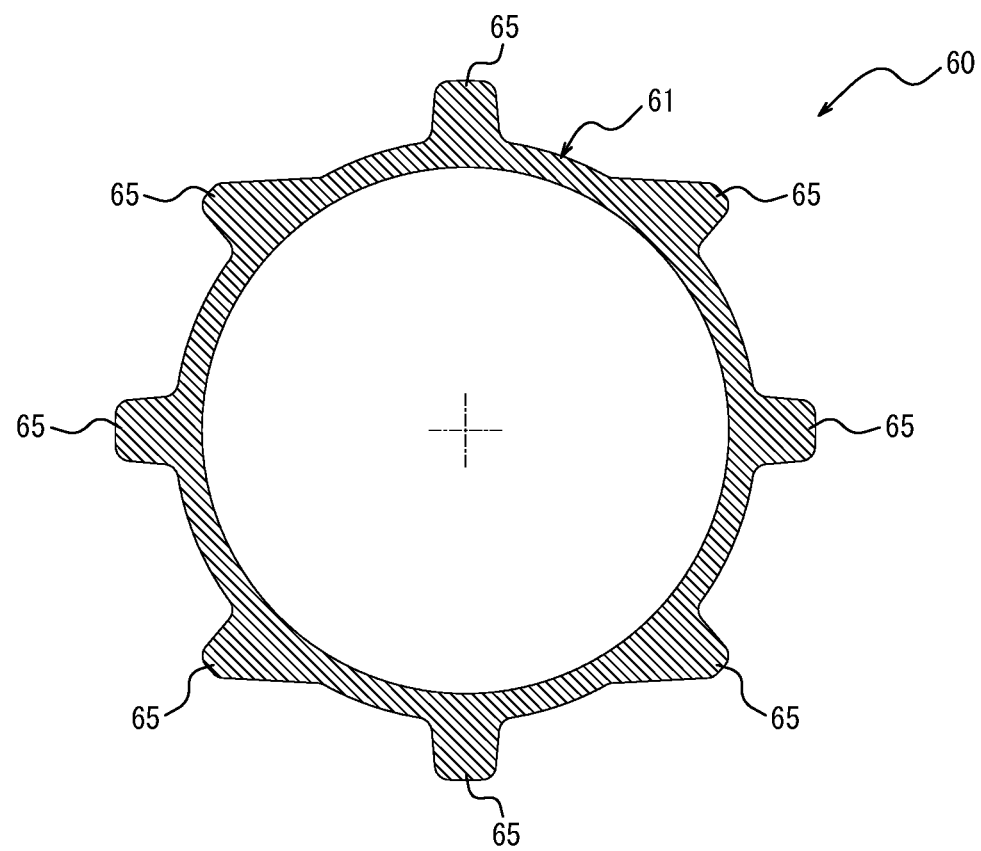
FIG. 14 is a sectional view taken along an E-E line in FIG. 12.

FIG. 11 is a sectional view of a laminated peelable container according to a modification in which four thick ribs are provided in a containing chamber. FIG. 12 is a partially cut-out side view of an inner preform used to form a laminated peelable container according to a modification as illustrated in FIG. 11. FIG. 13 is a sectional view taken along a D-D line in FIG. 12, and FIG. 14 is a sectional view taken along an E-E line in FIG. 12. In FIGS. 11 to 14, members corresponding to those described above are denoted by the same reference numerals.

As illustrated in FIG. 11, the laminated peelable container 1 may also be configured to include four thick ribs 30, which are provided in the containing chamber 22 and which are arranged at an equal interval in the circumferential direction about the axial center O of the trunk 12. This configuration according to the modification also prevents, when the containing chamber 22 undergoes volume reduction and deformation in conjunction with dispensing of the content liquid, portions of the containing chamber 22 in which the four thick ribs 30 from being peeled from the inner surface of the trunk main body 12b. Accordingly, a portion of the containing chamber 22 that corresponds to the trunk main body 12b is capable of undergoing even volume reduction and deformation into a shape whose section is substantially uniform in the direction of the axial center O of the trunk 12 (i.e., in the vertical direction). Similarly to the case in which the two thick ribs 30 are provided in the containing chamber 22, this configuration therefore prevents the problem of inability to dispense the content liquid to the end because of narrowing and blockage of a dispensing path for the content liquid due to portions of the inner surface of the containing chamber 22 that are located at the middle thereof in the vertical direction coming into close contact with each other. Accordingly, the residual amount of the content liquid remained in the laminated peelable container 1 is reduced.

The laminated peelable container 1 according to the modification illustrated in FIG. 11 may be formed by blow molding the preform assembly 40, in which the inner preform 60 is assembled into the outer preform 50. The inner preform 60 used in this case may include the one illustrated in FIGS. 12 and 13, in which four thickness formation ribs 66 are arranged at an equal interval in the circumferential direction on the inner circumferential surface of the stretched portion 64.

Additionally, in the inner preform 60 illustrated in FIG. 12, eight vertical ribs 65 are provided around the entire outer circumferential surface of the inner mouth 61 as illustrated in FIG. 14.

In the laminated peelable container 1 according to the present embodiment, the trunk 12 may be fitted with a decorative label covering an outer surface of the trunk 12. Although not illustrated in details, examples of such a decorative label may include various types of labels, such as a shrink label.

In this regard, since the laminated peelable container 1 according to the present embodiment is a transparent container in which both the outer layer body 10 and the inner layer body 20 are made from a polyethylene terephthalate resin, the content liquid contained in the containing space S is visible from the outside. However, the decorative label covering the outer surface of the trunk 12 prevents visualization of the content liquid contained in the containing space S from the outside. In view of the above, the decorative label fitted to the transparent laminated peelable container 1 according to the present embodiment is provided with a remaining-amount confirmation window that extends in the vertical direction in a portion of the decorative label in the circumferential direction and that makes visible the content liquid contained in the containing chamber 22. In this case, the window may be formed by making a portion of the decorative label transparent or by cutting out a portion of the decorative label. The decorative label with the above configuration is fitted to the trunk 12 in a manner such that the window extends in the vertical direction in a position misaligned with respect to any of the thick ribs 30 in the circumferential direction. By doing so, the circulation path P, which is defined in accordance with the thick ribs 30 and which is always filled with the content liquid even when the remaining amount of the content liquid is small, remains visible through the window, and an erroneous recognition of the remaining amount is prevented. Accordingly, the accurate remaining amount of the content liquid contained in the containing chamber 22 is visible through the window.

Needless to say, the present disclosure is not limited to the above embodiment, and various changes may be made without departing the gist of the present disclosure.

For example, although in the above embodiment the containing chamber 22 is provided with the two or the four thick ribs 30, any number of, but at least two, thick ribs 30 may be provided.

Furthermore, although in the present embodiment each thick rib 30 is provided to reach the shoulder 12a from the bottom 12c, the present disclosure is not limited to the present embodiment, and the length of the thick rib 30 in the vertical direction may be changed in various ways. For example, each thick rib 30 may be extended to reach the lower end of the inner mouth 21.

Moreover, although in the above embodiment the outer mouth 11 is provided with the pair of ambient air inlets 13, at least one ambient air inlet 13 is sufficient.

Moreover, although each ambient air inlet 13 is provided in the outer mouth 11 as a through hole passing through the outer mouth 11, the present disclosure is not limited to the above embodiment. For example, the ambient air inlet 13 may be formed between the upper end of the outer mouth 11 and the upper end of the inner mouth 21 as a gap that is open to the outside. Alternatively, the ambient air inlet 13 may be provided in the shoulder 12a, the trunk main body 12b, or the bottom 12c.

Moreover, the material of the outer layer body 10 is not limited to a polyethylene terephthalate resin, and other synthetic resin materials, such as a polyester resin, a polyolefin resin, a nylon resin, a polycarbonate (PC) resin, a cycloolefin copolymer (COC) resin, and a cycloolefin polymer (COP) resin, may also be used.

Moreover, the material of the inner layer body 20 is not limited to a polyethylene terephthalate resin, and other synthetic resin materials, such as a polyester resin, a polyolefin resin, a nylon resin, a polycarbonate (PC) resin, a cycloolefin copolymer (COC) resin, a cycloolefin polymer (COP) resin, and an ethylene-vinyl alcohol copolymer (EVOH) resin, may also be used. When an ethylene-vinyl alcohol copolymer resin is used as the material of the inner layer body 20, the one with an appropriate ethylene content may be used in consideration of barrier properties and flexibility. Furthermore, to ensure barrier properties, the inner layer body 20 may have a multi-layer structure in which, for example, a barrier layer, such as an MX nylon resin layer, is provided between a pair of polyethylene terephthalate resin layers.

Furthermore, the outer mouth 11 does not need to be provided with the neck ring 14, and the shapes of the shoulder 12a, the trunk main body 12b, and the bottom 12c may be changed in various ways.

Moreover, the above embodiment describes the example in which, by fitting a dispensing cap including a dispensing spout to the outer mouth 1, the laminated peelable container 1 is employed as a squeeze dispensing container that is configured to dispense the content liquid in response to squeezing of the trunk 12. However, by fitting a pump dispensing device to the outer mouth 11, the laminated peelable container 1 may also be employed as a pump container in which the trunk 12 has predetermined rigidity that prevents easy squeeze deformation of the trunk 12.

Moreover, although in the above embodiment the thickness formation ribs 66 are provided on the inner circumferential surface of the stretched portion 64 of the inner preform 60 to protrude toward the inner side in the radial direction from the inner circumferential surface, the thickness formation ribs 66 may also be provided on the outer circumferential surface of the stretched portion 64 of the inner preform 60 to protrude toward the outer side in the radial direction from the outer circumferential surface.

REFERENCE SIGNS LIST

1 Laminated peelable container
10 Outer layer body
11 Outer mouth
11a Male screw
12 Trunk
12a Shoulder
12b Trunk main body
12c Bottom
13 Ambient air inlet
14 Neck ring
15 Concave rib
20 Inner layer body
21 Inner mouth
22 Containing chamber
23 Gap
24 Large-diameter portion
25 Flange portion
26 Vertical rib
30 Thick rib
40 Preform assembly
50 Outer preform
51 Outer mouth
51a Female screw
52 Ambient air inlet
53 Stretched portion
54 Neck ring
60 Inner preform
61 Inner mouth
62 Large-diameter portion
63 Flange portion
64 Stretched portion
65 Vertical rib
66 Thickness formation rib
O Axial center
S Containing space
P Circulation path

The invention claimed is:

1. A synthetic resin-made laminated peelable container formed by blow molding a preform assembly including an outer preform formed by injection molding and an inner preform formed by injection molding separately from the outer preform and assembled into the outer preform, the laminated peelable container comprising:

an outer layer body including i) a tubular-shaped outer mouth and ii) a closed-bottom tubular-shaped trunk extending contiguously from the outer mouth;

an inner layer body including i) a tubular-shaped inner mouth on an inner side of the outer mouth and ii) a containing chamber laminated on an inner surface of the trunk in a peelable manner and configured to undergo volume reduction and deformation; and an ambient air inlet configured to introduce ambient air between the outer layer body and the inner layer body, wherein the ambient air inlet is a through hole passing through the outer mouth in a radial direction or is a gap between the upper end of the outer mouth and the upper end of the inner mouth that is open to outside, an outer surface of the inner layer body or an inner surface of the outer layer body is integral with a vertical rib which extends from the inner mouth to the containing chamber in a direction along an axis line of the trunk and creates a space for a flow path for ambient air between the outer layer body and the inner layer body, the containing chamber includes at least two ribs that are integral with the containing chamber, each of the ribs extending in the direction along the axis line of the trunk and increasing a thickness of the containing chamber compared with remaining portions of the containing chamber, and the at least two ribs are not in the inner mouth, wherein the vertical rib is on either the outer surface of the inner layer body or the inner surface of the outer layer body and contacts the other of the outer surface of the inner layer body or the inner surface of the outer layer body.

2. A laminated peelable container according to claim 1, wherein
the trunk includes a shoulder extending contiguously from a lower end of the outer mouth, a tubular-shaped trunk main body extending contiguously from a lower end of the shoulder, and a bottom closing a lower end of the trunk main body, and
each of the at least two ribs extends at least from a position corresponding to the lower end of the trunk main body to a position corresponding to an upper end of the trunk main body.

3. A laminated peelable container according to claim 2, wherein
each of the at least two ribs extends from a position corresponding to the bottom to a position corresponding to the shoulder.

4. A laminated peelable container according to claim 1, wherein
the at least two ribs are symmetrical about an axial center of the trunk.

5. A laminated peelable container according to claim 4, wherein
the outer mouth comprises a pair of the ambient air inlets symmetrical about an axial center of the outer mouth, and
each of the pair of the ambient air inlets is open toward a central position in a circumferential direction about the axial center of the trunk between two adjacent ribs of the at least two ribs.

6. A laminated peelable container according to claim 1, wherein
the at least two ribs comprise four ribs arranged at an equal interval in a circumferential direction about an axial center of the trunk.

7. A laminated peelable container according to claim 1, wherein
each of the outer layer body and the inner layer body is made from a polyethylene terephthalate resin.

8. A laminated peelable container according to claim 7, wherein
the trunk is fitted with a decorative label covering an outer surface of the trunk, the decorative label comprising a remaining-amount confirmation window that extends in a vertical direction in a position misaligned with respect to any of the at least two ribs in a circumferential direction to make visible a content liquid contained in the containing chamber.

* * * * *